United States Patent [19]
Osdor

[11] 3,755,088
[45] Aug. 28, 1973

[54] INTERNALLY INTERCONNECTED MULTI-STAGE DISTILLATION SYSTEM

[75] Inventor: Asriel Osdor, Tel Aviv, Israel

[73] Assignee: Hydro Chemical & Mineral Corp., New York, N.Y.

[22] Filed: Dec. 4, 1970

[21] Appl. No.: 95,215

Related U.S. Application Data

[63] Continuation-in-part of Ser. No. 847,103, Aug. 4, 1969, Pat. No. 3,627,646.

[52] U.S. Cl. ............ 202/173, 159/13, 159/14, 159/15, 159/18, 202/185 A, 202/186, 203/10, 203/11

[51] Int. Cl. ........ B01d 1/22, B01d 1/26, B01d 3/00, B01d 3/10

[58] Field of Search ............... 159/2 MS, 18, 13 B, 159/15, DIG. 17; 202/158, 173, 185 A, 174; 261/113; 203/100, 100 DL, 10, 11

[56] References Cited
UNITED STATES PATENTS

| | | | |
|---|---|---|---|
| 2,749,094 | 6/1956 | Lewis et al. | 202/158 X |
| 2,912,377 | 11/1959 | Lehrian | 202/158 X |
| 2,967,699 | 1/1961 | Brown | 202/158 X |
| 3,249,517 | 5/1966 | Lockman | 159/18 X |
| 3,298,932 | 1/1967 | Bauer | 203/11 |
| 3,232,847 | 2/1966 | Hoff | 203/11 |
| 3,303,106 | 2/1967 | Standiford, Jr. | 159/18 X |
| 3,434,701 | 3/1969 | Bauer | 202/158 |
| 3,464,679 | 9/1969 | Becker | 202/158 X |
| 3,627,646 | 12/1971 | Osdor | 159/2 MS |

Primary Examiner—Norman Yudkoff
Assistant Examiner—J. Sofer
Attorney—Ward, McElhannon, Brooks & Fitzpatrick

[57] ABSTRACT

Evaporator and condenser arrangements for multi-stage systems formed from continuous tubular columns and transverse plates. In the condensers, elongated partition plates cooperate with segments of the column wall to define internal liquid passageways between spaced condensers. In the evaporators, the transverse plates are shaped to define wells and trap forming partitions. Arrangements are described for achieving interspersal of condenser groups with minimum pumping and minimum use of column height.

14 Claims, 31 Drawing Figures

INVENTOR.
ASRIEL OSDOR

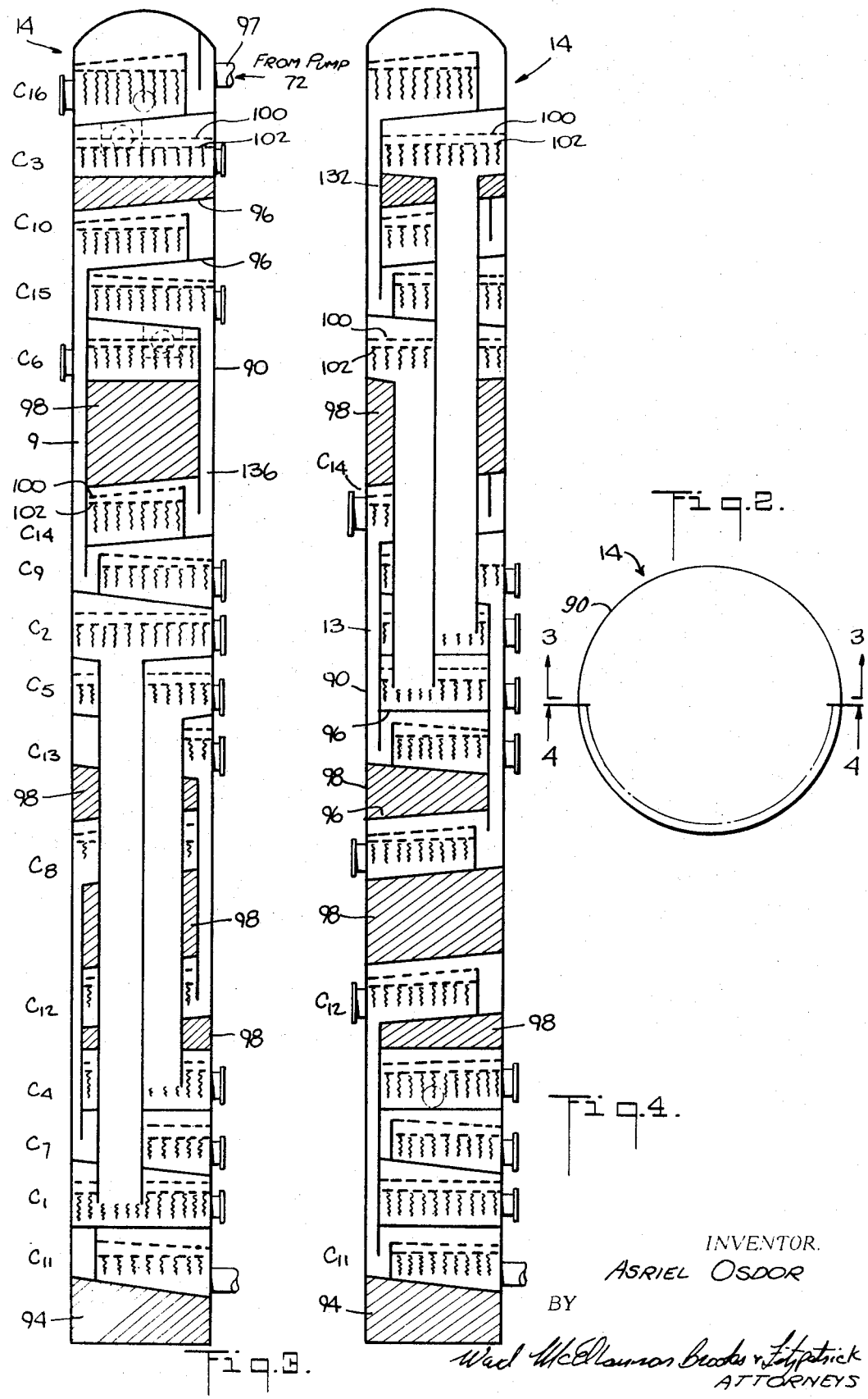

Patented Aug. 28, 1973
3,755,088
12 Sheets-Sheet 3
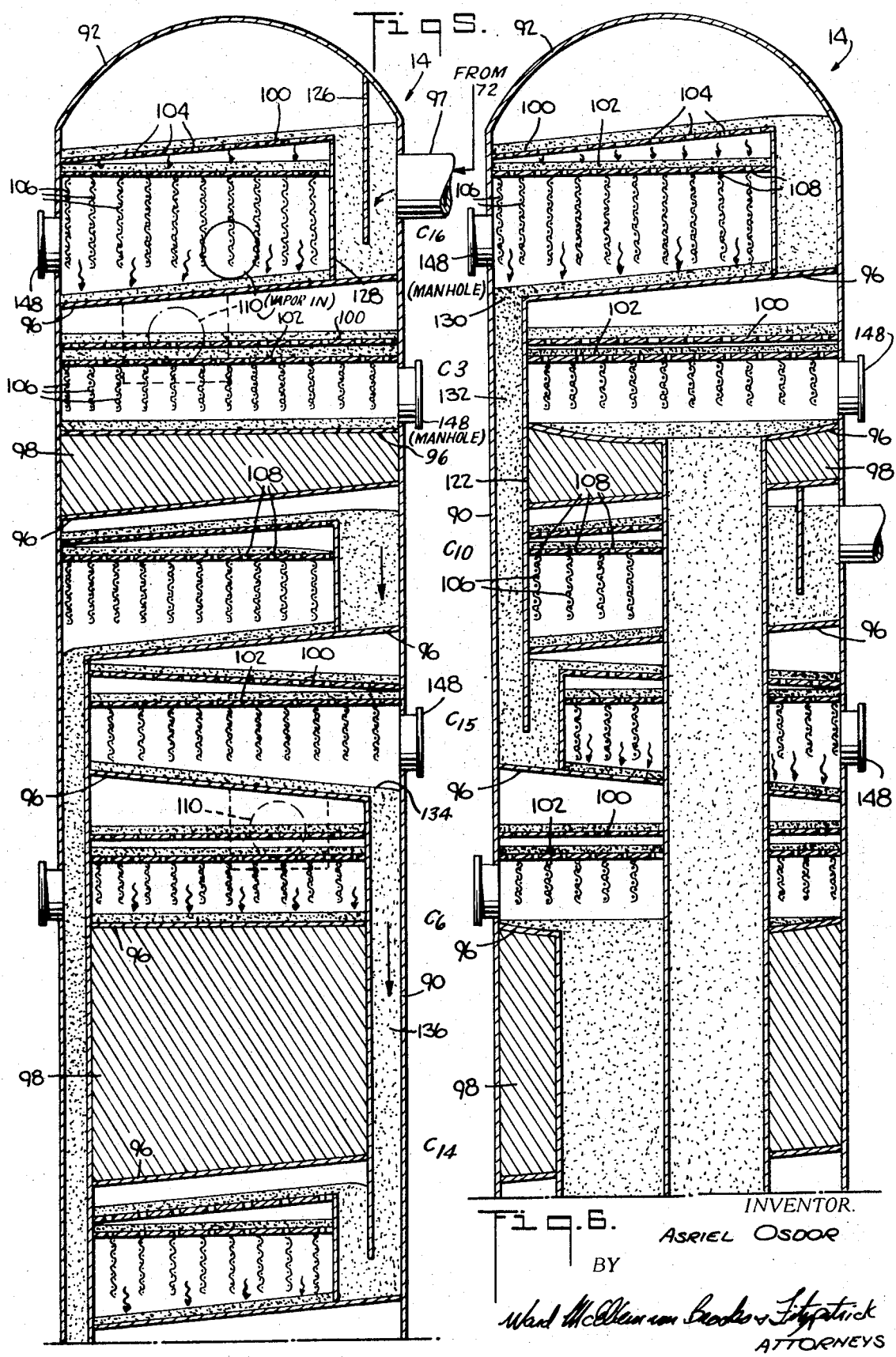
INVENTOR.
ASRIEL OSDOR
BY
ATTORNEYS

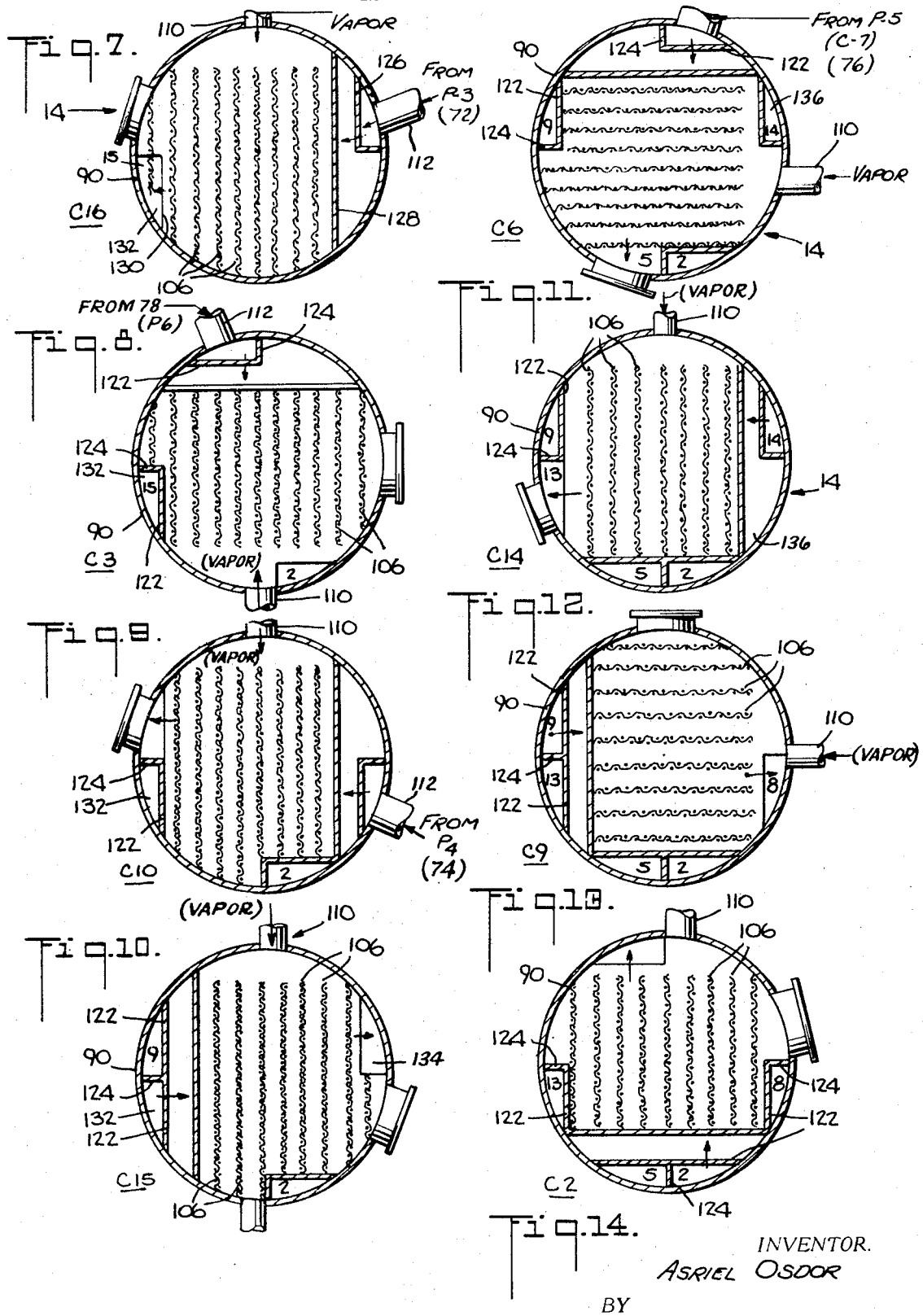

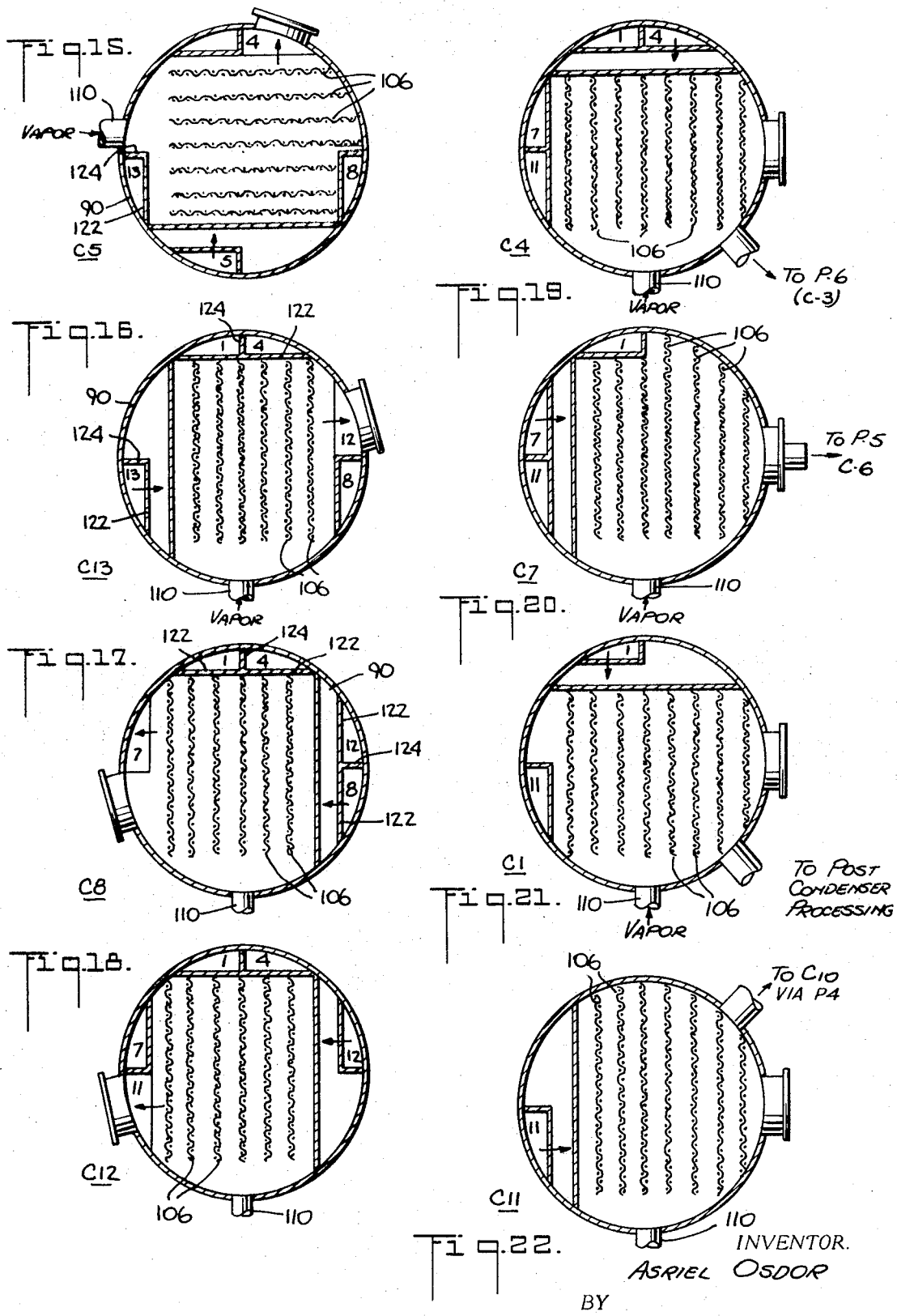

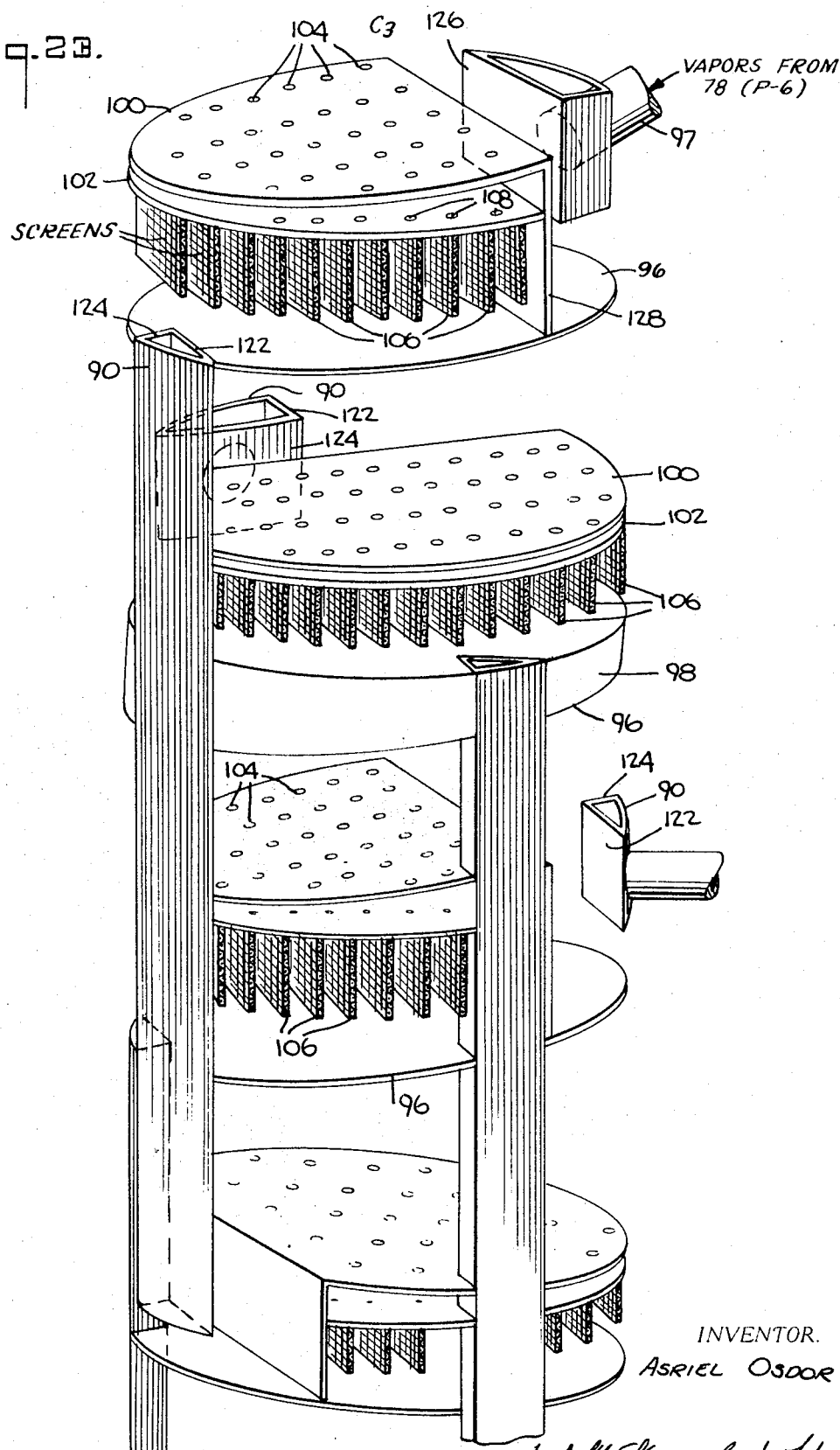

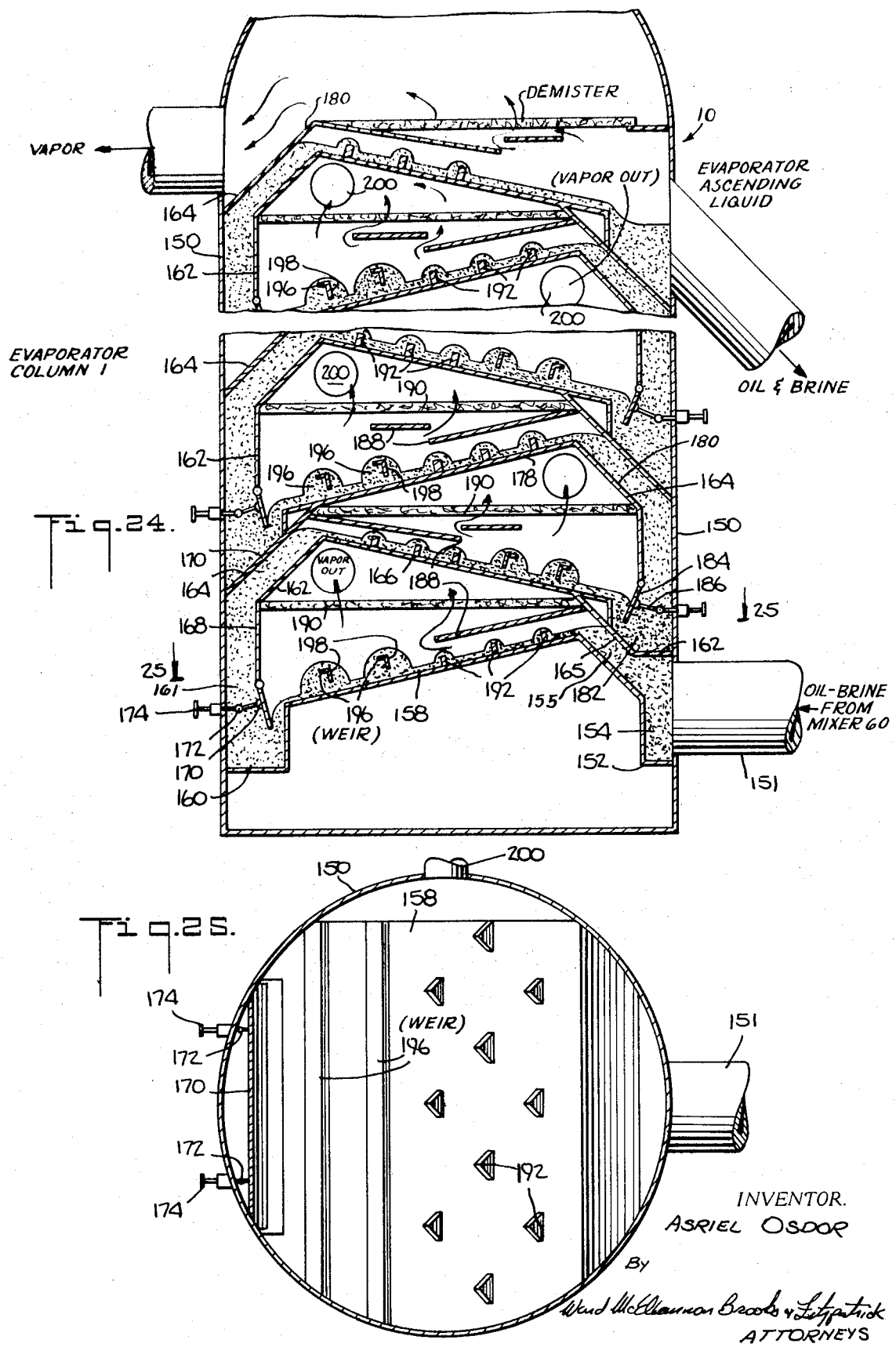

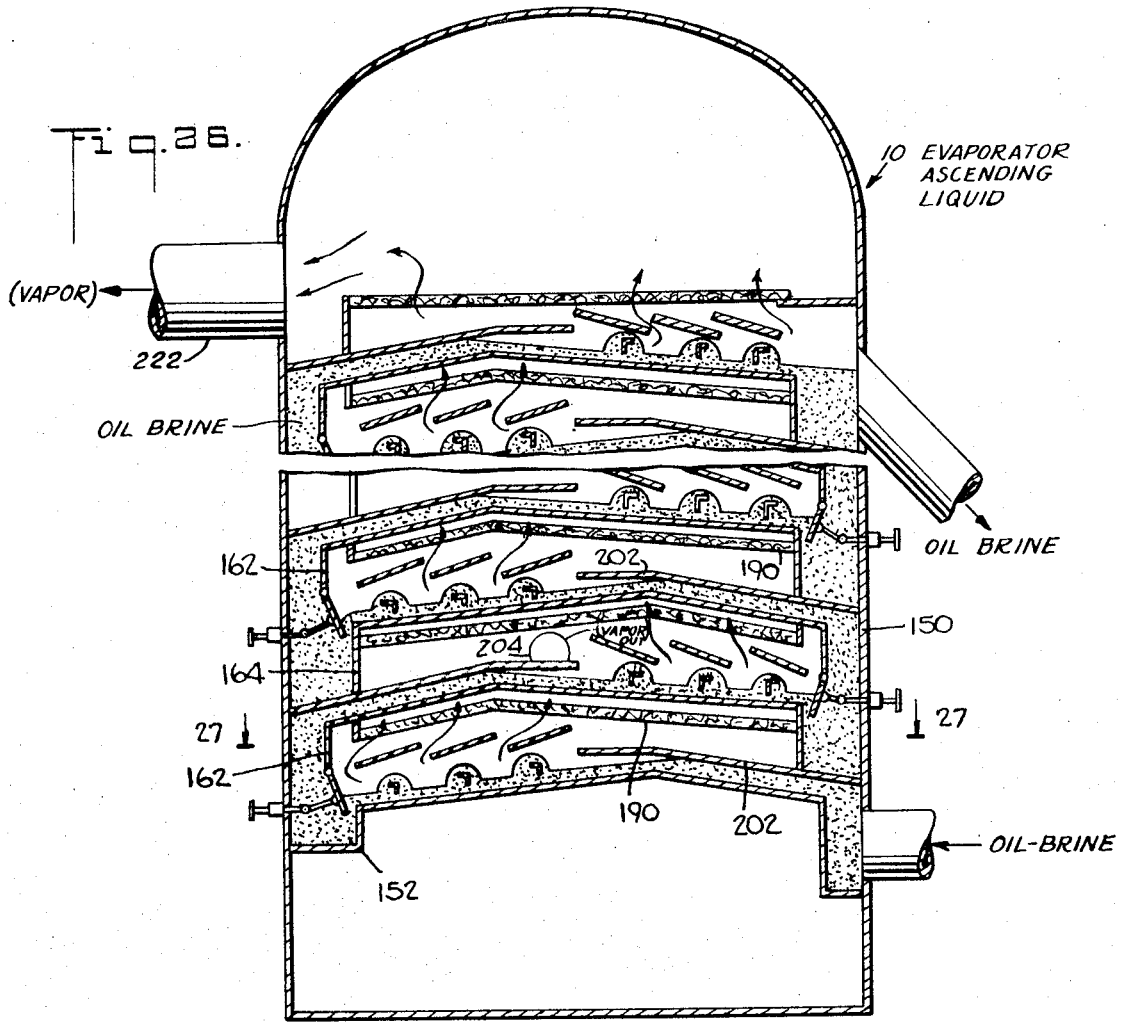

Patented Aug. 28, 1973

INVENTOR.
ASRIEL OSOOR.
BY
ATTORNEYS

INTERNALLY INTERCONNECTED MULTI-STAGE DISTILLATION SYSTEM

This is a continuation-in-part of a copending parent application Ser. No. 847,103 filed Aug. 4, 1969, now U.S. Pat. No. 3,627,646 in the name of Asriel Osdor, the inventor of the present invention.

This invention relates to solvent recovery systems and more particularly, it concerns novel multistage flash evaporation and interspersed direct contact condenser apparatus useful in separating substances of different volatility from mixtures and solutions. A particularly useful application of the present invention is in the field of sea water desalination; and for purposes of illustration, the invention will be described as embodied in such a desalination system.

In the above-identified copending parent application, there is shown and described a multistage flash evaporation system for extracting fresh water, and even minerals and salts, from sea water. That system includes a plurality of columns, each divided into vertically arranged evaporation chambers or vertically arranged condenser chambers. A number of pipes are shown interconnecting the various chambers to provide fluid communication between them. One feature of that arrangement is that in each of the condenser columns, the condensers are arranged into groups of successive condensers with the individual condensers of the one group being interspersed physically between those of other groups. This arrangement permits sufficient vertical distance between the successive condensers of a group in order to obtain a necessary pressure head between them; and at the same time it permits the incorporation of several condenser groups in a single column without requiring excessive column height. In the interspersed condenser arrangement, the interstage piping for fluid flow from stage to stage is arranged such that the fluid in flowing from one stage to the next of a given condenser group bypasses the interspersed condensers of other groups around the stages of the other groups.

The present invention provides a novel structural configuration for the evaporator and condenser stages. According to the present invention, this novel configuration is more compact and is of simpler construction than previous arrangements. Moreover, it is inherently stronger, and at the same time, more easily inspected and repaired than prior multistage systems. The present invention also permits more flexible and finer control of operation of the system by providing individual interstage liquid flow control among the evaporator stages.

According to one aspect of the present invention, there is provided a novel multistage condensation system of groups of interspersed condenser stages in vertical alignment in a common tubular column. The column is divided into several stages or chambers by means of vertically displaced transverse plates inside the column. The stages are interconnected by vertical conduits which pass through some of the plates to bypass intermediate stages, thereby providing an interspersed arrangement. As illustratively embodied, the vertical conduits themselves are formed by vertically extending plates secured and sealed, as by welding, along their edges to the interior walls of the tubular column. These plates pass through the transverse plates defining the condensing chambers which are bypassed. In the illustrative embodiment, different conduits are provided at different locations about the tubular column to distribute thermal and mechanical stresses and reinforcement throughout the column.

According to another aspect of the present invention, there is provided a novel multistage evaporation apparatus comprising a closed, pressure supporting, upstanding tubular column divided internally, by means of vertically displaced plates, into a series of vaporization chambers. These plates are inclined down toward openings which communicate with an adjacent vaporization chamber. The inclination of the plates serves to provide, along their upper edge, a liquid flow path which is conducive to agitation and turbulent flow which promotes vaporization. The stages are also arranged such that the inclination of the plates serves to define an expanding vapor space in the direction of liquid flow in the next lower stage. The openings between stages are provided with suitable partitioning to define liquid traps which provides a hydraulic seal so that an interstage pressure differential may be maintained from stage to stage. In this way substantially all external piping for the liquid flow can be eliminated. In addition, the internal piping can be formed with vertically extending plates which cooperate with the walls of the tubular column to define vertical fluid conduits between the stages. By integrating the interstage piping with the overall tubular column, the overall structure becomes intrinsically strengthened and the amount of structural reinforcement can be reduced. Further, only the external tubular column need be designed to withstand the maximum pressures of the system; the pressures across the internal fluid conduit and vaporization stage defining plates is, by comparison, quite minimal. Each internal hydraulic seal-producing configuration includes a damper arrangement, externally controlled to provide flexibility in regulating liquid flow along the system.

According to a further aspect of the present invention, novel condenser interspersed arrangements are provided and condenser temperature profiles are utilized in order to reduce pumping losses and to obtain the most practical condenser column height, for various types of evaporator and condenser systems.

Various further and more specific objects, features and advantages of the invention will appear from the description given below, taken in connection with the accompanying drawings, illustrating by way of example preferred forms of the invention.

In the drawings:

FIG. 2 is a top view of a condenser column utilized in the system of FIG. 1;

FIG. 3 is an elevational section view taken along line 3—3 of the column of FIG. 2;

FIG. 4 is a further elevational section view taken along line 4—4 of the column of FIG. 2;

FIGS. 5 and 6 are enlarged fragmentary views of the upper portions of FIGS. 3 and 4, respectively;

FIGS. 7–22 are cross-section views taken through the condenser column of FIGS. 2–6 at each of the condenser chambers indicated in the respective FIGS.;

FIG. 23 is a cutaway perspective view illustrating internal partition arrangements in the condenser column of FIGS. 2–22;

FIG. 24 is an elevational section view, aprtically cut away, illustrating the internal configuration of the upper portion of the first evaporator column of FIG. 1;

FIG. 25 is a cross-section view taken along line 25—25 of FIG. 24;

FIG. 26 is an elevational section view, partially cut away, illustrating the internal configuration of a modified version of the first evaporator column of FIG. 1;

FIG. 27 is a cross-section view taken along line 27—27 of FIG. 26;

Figure 1:
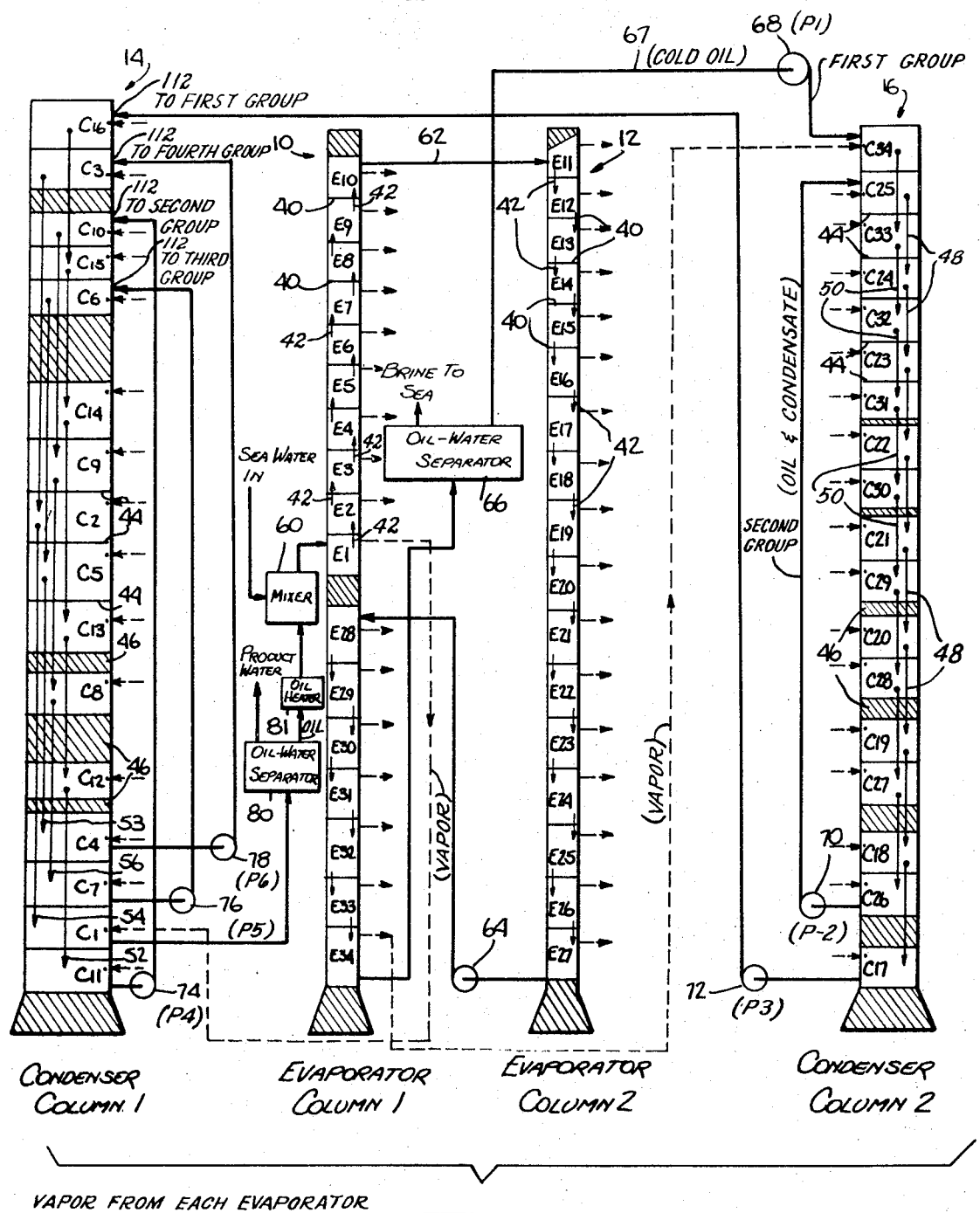
FIG. 1 is a diagramatic representation of an oil-water type multistage desalination system in which the present invention is embodied.

The desalination system shown diagramatically in FIG. 1 comprises first and second multistage evaporator columns 10 and 12 and first and second condenser columns 14 and 16. The two evaporator columns are divided by transverse evaporator partitions 40 into a series of vertically arranged evaporation stages $E_1$, $E_2$, $E_3$....$E_{34}$. It will be understood by those skilled in the art that the number and arrangements of these evaporation stages have an effect on the operating conditions, i.e., the temperature and pressure profile throughout the system. It will also be understood, however, that for certain aspects of the invention the number and arrangement of the evaporator stages is incidental. In the arrangement of FIG. 1, the first or highest pressure evaporator stage $E_1$ is located about midway up the first evaporator column 10, while the stages $E_2$, $E_3$....$E_{10}$ are arranged in order above the first stage $E_1$. The following stages, from $E_{11}$ to $E_{27}$, are arranged in order proceeding downwardly through the length of the second evaporator column 12. Finally, the remaining stages $E_{28}$ to $E_{34}$ are arranged in order proceeding downwardly through the lower half of the first evaporator column 10.

The various evaporator stages are pressure isolated from each other and are maintained at successively decreasing pressures from the highest pressure stage $E_1$, to the lowest pressure stage $E_{34}$. Internal liquid passageways, indicated by short arrow lines 42, permit the flow of liquids from stage to stage while maintaining the stages vapor pressure isolated to a desired degree from one another.

The condenser columns 14 and 16 are also divided by means of transverse condenser partitions 44 and spacers 46, into vertically arranged condenser stages $C_1$, $C_2$....$C_{34}$. These condenser stages are maintained in order of successively decreasing pressure from the highest pressure condenser stage $C_1$ to the lowest pressure stage $C_{34}$.

The various condenser stages are arranged in interspersed groups in each of the two condenser columns with the condenser stages $C_{34}$, $C_{33}$....$C_{26}$ forming a first group and the condenser stages $C_{25}$, $C_{24}$....$C_{17}$ forming a second group in the second condenser column 16. The individual condenser stages of the second group are each located between successive stages of the first group. Internal liquid flow connections, to be described more fully hereinafter, communicate between successive condenser stages of each group, and pass internally through the stages of the other group. These passageways are indicated diagramatically by vertical lines 48 and 50 in FIG. 1. These lines are shown to be interrupted by dots and arrow heads indicating, respectively, the beginning and end of liquid flow from one condenser stage to the next in a particular group and bypassing through the interspersed condenser stage of the other group.

As shown in FIG. 1, four groups of condenser stages, i.e., $C_{16}$....$C_{11}$, $C_{10}$....$C_7$, $C_6$....$C_4$, and $C_3$....$C_1$, are interspersed in similar manner in the first condenser column 14. Four additional vertical lines 52, 54, 56 and 53 indicate diagramatically the arrangement of internal liquid connections communicating between successive stages of each group and internally bypassing the stages of the other groups.

The system of FIG. 1 can be used to obtain fresh or salt-free water from saline water such as sea water; and in such process an intermediate heat transfer liquid flows through the condenser and evaporator stages. As indicated in FIG. 1, sea water which has been heated, e.g., to 180° C is mixed with hot oil in an oil-water mixer 60, and this mixture is passed into the first evaporator stage $E_1$. The pressure in the first stage is maintained just below the saturation pressure of the heated sea water so that a portion of the sea water vaporizes. The heat required for this vaporization is obtained from the sensible heat of the remaining unevaporated sea water and the accompanying oil and the temperature of these liquids decreases accordingly. The unevaporated sea water and oil are then transferred via the uppermost internal liquid passageway 42 to the next evaporator stage $E_2$ which is maintained just below the saturation pressure of the incoming sea water. In those cases where succeeding evaporator stages are above preceding stages, as from $E_1$ to $E_{10}$, the pressure difference between the consecutive stages and the energy released in vaporization in each stage may be utilized to drive the liquids up to the next stage. The liquids from the evaporator stage $E_{10}$ flow across via a crossover conduit 62 to the next evaporator stage $E_{11}$ which occupies the highest level in the second evaporator column 12. The liquids flow down from stage to stage in this column while further evaporation and pressure reduction is experienced. The flow of liquids from stage to stage in the second evaporator column 12 is by pressure difference and by gravity. After passing through the last or lowermost evaporation stage of the second evaporator column 12 (i.e., $E_{27}$), the oil and accompanying brine are pumped through an evaporator pump 64 up to the next evaporator stage $E_{28}$ located about midway up the first evaporator column 10. The evaporation process and the flow of liquids continues successively downwardly from stage to stage to the last evaporator stage $E_{34}$. In each stage, heat for evaporation is taken from the unevaporated brine and the accompanying oil so that these liquids become cooled substantially, e.g., to about 45° C, in the last evaporator stage $E_{34}$.

The vapors formed in each evaporator stage are transferred to corresponding condenser stages via associated vapor transfer conduits shown in dashed lines.

The liquid residue from the last evaporator stage $E_{34}$ passes into a first separator 66 which separates oil from residual brine and precipitated salts. If the final brine concentration reached in the multistage flash evaporation process is not higher than 26 percent, then the salts which precipitate out from the sea water will be calcium carbonates and sulfates. If the brine concentration exceeds 26 percent, then chloride precipitates until the concentration reaches 32° to 34° C. The elevational differences between consecutive condenser and evaporator stages in FIG. 1 have been calculated for all possible cases for residual brine going from 4.6 to 34 percent to salt content. The 4.6 percent concentration is obtained when no oil is used in the evaporator. The oil which is obtained from the separator 66 is washed and cooled and is transferred via an oil conduit 67 and a first inter-condenser pump 68 to the uppermost condenser stage $E_{34}$ of the second condenser column 16. This incoming oil, which is at a temperature slightly below the temperature of the vapors in this condenser stage, is distributed down through the direct contact condensing stage in contact with the vapors. The oil thus extracts heat from the vapors and condenses them. The oil and liquid condensate thus formed pass together down past the interspersed condenser $C_{25}$ to the next successive condenser $C_{33}$ where a similar condensing action takes place at a slightly higher temperature and pressure. This process continues at successively higher temperatures and pressures down through the first group of condensers to the condenser $C_{26}$. The oil and accompanying condensate are then pumped, by means of a second inter-condenser pump 70, to the highest condenser stage $C_{25}$ of the next condenser group. The condensing process continues in similar manner down through the second group; thereafter, the oil and water are pumped successively by third, fourth, fifth and sixth inter-condenser pumps 72, 74, 76 and 78 up to the highest condenser stages of the third, fourth, fifth and sixth condenser groups which are interspersed in the first condenser column 14. The oil and water from the final condenser stage $C_1$ then passes into a second oil-water separator 80 where salt-free water is recovered. Oil from the separator 80 is then heated in a heater 81 and transferred to the oil-water mixer 60 where it is mixed with incoming sea water for processing through the evaporator stages.

FIGS. 2–23 illustrate in detail the physical construction of the first condenser column 14 and in particular, they show the manner in which internal interconnections are provided between successive condenser stages of interspersed groups. As can be seen in FIGS. 2–5, the first condenser column 14 is made up of an elongated upstanding tubular outer wall 90 having a domed top 92 and a base 94. The interior of the column 14 is divided, by means of transverse partition plates 96, into vertically arranged condenser chambers or stages. While the system may be designed to any desired capacity, the arrangements of the present invention are particularly suitable for a system capable of producing 5,000,000 to 100,000,000 gallons or more of fresh water per day from sea water, and at the same time to recover refined sodium chloride and a concentrated residual brine containing 34 to 40 percent of salts (mainly magnesium salts). For a 10 MGD (million gallon per day) plant, the four columns will have a diameter of approximately 7 meters and a height of approximately 70 meters each. For a 100 MGD plant, the diameter will be approximately 22 meters because the output increases proportionally with increases of the square of the diameter of the condenser.

As can be seen in FIGS. 3, 4, 5, 6 and 23, the transverse partition plates 96 extend substantially completely across the condenser column to divide it vertically into the various condenser stages $C_1$....$C_{16}$. As indicated above, the condenser stages making up the first condenser column 14 are arranged in four groups of interspersed condenser stages and follow a pattern downwardly through the column as follows: $C_{16}$, $C_3$, $C_{10}$ $C_{15}$, $C_6$, $C_{14}$, $C_9$, $C_2$, $C_5$, $C_{13}$, $C_8$, $C_{12}$, $C_4$, $C_7$, $C_1$ and $C_{11}$. As shown in the drawing, a number of spacers 98 are provided between selected condenser stages, i.e., between $C_3$ and $C_{10}$, between $C_6$ and $C_{14}$, between $C_{13}$ and $C_8$ and between $C_{12}$ and $C_4$. The condenser stages themselves are each of approximately the same vertical height, in the neighborhood of 2 meters. The size and location of the various spacers 98 is arranged to insure a proper height between successive condenser stages in each given group so that a proper liquid head differential corresponding to the pressure differential between the successive condenser stages is maintained.

Within each condenser stage, there are provided a pair of closely positioned upper and lower condensing liquid distribution plates 100 and 102. The upper plate 100 in each condenser stage is tilted so as to insure a flow of liquid across and above the plate. As shown in FIGS. 5 and 6, the upper condensing liquid distribtuion plate 100 for the condenser stages $C_{16}$, $C_{10}$ and $C_{14}$, is tilted downwardly to the left, while the upper condensing liquid distribution plate 100 for the condenser stage $C_{15}$, is tilted downwardly to the right. As can be seen in FIG. 23, the corresponding upper condensing liquid distribution plate 100 for the condenser stage $C_3$, is tilted downwardly in a forward direction, i.e., out of the plane of the drawing. Actually, the upper condensing liquid distribution plate 100 tilts downwardly from the direction of condensing liquid input to the condenser stage toward the opposite end of the stage. The upper condensing liquid distribution plates 100 each are provided with a plurality of perforations 104 through which condensing liquid, i.e., oil and condensate, drips downwardly to the corresponding lower condensing liquid distribution plate 102. As can be seen in the drawings, this lower condensing liquid distribution plate 102 extends horizontally across each of the condenser stages. In this embodiment, a plurality of parallel screens 106 are suspended to extend downwardly through and below corresponding slots 108 in each of the lower condensing liquid distribution plates and cause the condensing liquid, which flows downwardly from the plates, to form liquid films or sheets so as to provide a maximum condensing liquid surface area which can be presented to vapors being admitted into each condenser stage. The screens 106 terminate a short distance above the transverse condenser partition plates 96.

Each of the condenser stages is provided with a vapor inlet opening 110 which, as can be seen in the cross-sectional views of FIGS. 7–22, enter through the side of the column in a direction substantially parallel to the lengthwise direction of the screens 106 in the stage. As can be seen in FIGS. 11, 13 and 15, this direction for the condenser stages $C_6$, $C_9$ and $C_5$ is 90° offset with respect to the other stages. It will also be noted in FIGS. 7–22 that the screens 106 terminate substantially in advance of the vapor inlet opening 110 to permit sufficient space for distribution of the vapors entering through the opening in order that the vapors may proceed substantially uniformly among and between the screens 106 along the length.

The uppermost condenser stage of the four groups of stages in the first condenser column 14 (i.e., the condenser stages $C_{16}$, $C_{10}$, $C_6$ and $C_3$) and also each provided with a condensing liquid inlet opening 112 connected to an associated one of the third, fourth, fifth and sixth pumps 72, 74, 76 and 78, respectively. The remaining liquid flow connections between these uppermost condenser stages and the successively lower stages in each group are constructed internally of the condenser column and will be described in detail hereinafter.

As can be seen in the cross-sectional views of 7–22 and in the perspective view of FIG. 23, there are provided a plurality of vertically extending flat partition plates 122 and 124, positioned within the column 14 between various condenser stages. These plates are secured and sealed, as by welding, along their edges to the wall 90 of the column and cooperate with segments of the wall to form the various internal liquid flow conduits between the successive condenser stages in each group. As will be described more fully hereinafter, these conduits effectively bypass in the intermediate interspersed condenser stages of other groups.

As shown in FIGS. 5 and 6, additional vertically extending partition walls 126 and 128 extend, respectively, down from the domed top 92 and up from the transverse partition plate 96 in the vicinity of the condensing liquid inlet opening 110. This arrangement provides a liquid trap for maintaining a liquid seal for liquid entering the column via an inlet conduit 97, from the pump 72. As can be seen in FIG. 5, incoming liquid flows downwardly and around the first partition wall 126 and up and over the second wall 128 onto the upper (preferably inclined) condensing liquid distribution plate 100.

As can be seen in FIGS. 6 and 7, there is provided an opening 130 in the (inclined) transverse partition plate 96 at the bottom of the first condenser stage $C_{16}$ approximately diametrically opposite the liquid trap formed by the partition walls 126 and 128. The opening 130 opens down into a first internal liquid passageway 132 (FIG. 6) which passes through and effectively bypasses the condenser stages $C_3$ and $C_{10}$ and terminates at a liquid trap formed within the next successive condenser of the first group (i.e., $C_{15}$). This first internal liquid passageway 132 is formed of a pair of the vertically extending flat partition plates 122 and 124 (FIG. 23) in cooperation with a segment of the outer wall 90 of the condenser column. As can be seen in FIGS. 8, 9 and 10, the vertically extending flat partition plates 122 and 124 forming the first internal liquid passageway 132, extend completely through the transverse partition plates 96 and the liquid distribution plates 100 and 102 of the intermediate interspersed condenser stages $C_3$ and $C_{10}$, as well as the upper spacer 98.

The liquid trap construction leading into the condenser stage $C_{15}$, as shown in FIG. 6, is substantially the same as that leading into the upper condenser stage $C_{16}$ with the sole difference being that the inlet to the condenser stage $C_{15}$ is entirely internal whereas that to the upper condenser stage $C_{16}$ is external to the column. The passage of liquid through the condenser stage $C_{15}$ follows the same pattern (however, in the opposite direction) as that which the liquid undergoes in passing through the upper condenser stage $C_{16}$. As can be seen in FIG. 10, there is provided a further opening 134 in the transverse partition plates 96 forming the bottom of the condenser stage $C_{15}$, and this further opening 134 leads to a second internal liquid passageway 136 of similar construction to the first internal liquid passageway 132. This second liquid passageway 136 proceeds through and bypasses the condenser stage $C_6$ and a second one of the spacers 98 to the condenser stage $C_{14}$ where it passes through trap forming partition walls to the upper surface of the upper condensing liquid distribution plate 100 of the condenser stage $C_{14}$.

Liquid continues to flow downwardly from the condenser stage $C_{16}$ to the next successive stage $C_{15}$ and similarly to the condenser stages $C_{14}$, $C_{13}$, $C_{12}$ and $C_{11}$, while bypassing the various intermediate stages and spacers in the manner described.

The various cross-sectional views of FIGS. 7–22 shows that the fluid passageways 132, 136, etc., interconnecting successive condenser stages in the column occupy different segmental regions about the periphery of the column 14. In each case, the various liquid passageways utilize as one wall therof a portion of the outer column wall 90 itself. The arrangement of the liquid passageways extending between successive condenser stages must follow a pattern such that the segment occupied by a given passageway may not be occupied by passageways or any other internal structure of the condenser stages being bypassed by the particular passageway. Thus, for example, the first liquid passageway 132, which extends between the upper condenser stage $C_{16}$ (FIG. 7) and the next successive condenser stage $C_{15}$ (FIG. 10), passes through the lower portion of the lefthand segment of these two condenser stages as well as the corresponding regions of the intermediate condenser stages being bypassed, i.e., $C_3$ and $C_{10}$ (FIGS. 8 and 9).

It will also be noted that wherever a fluid passageway opens into a condenser stage via a liquid trap, the next fluid passageway through which liquid flows out from the condenser stage, is located approximately diametrically opposite the incoming liquid. In addition to providing a more evenly distributed flow of liquid across the condenser stages, this alternate arrangement of successive liquid passageways provides for a temperature distribution along the column such that any mechanical stresses, resulting from thermal expansion and/or contraction, are distributed along opposite sides of the column so as to minimize the net bending effects produced by the temperature differentials encountered.

The particular construction of the internal liquid passageways between the successive condenser stages, according to the present invention, eliminates the need for special devices which might otherwise be needed to accommodate thermal expansion and/or contraction within the system. In prior systems utilizing external pipes between various condenser stages, special means were required to accommodate the relative differential expansion between the interconnecting pipe and the physical structure between the condensers themselves. This was necessary in order to prevent the concentration of excessive stresses which might rupture a weak point in the system. In the present situation, the liquid passageways are integral with and are formed in part by the walls of the column itself, this column serving as the pressurized side walls of the condenser as well as the structure supporting the successive condenser stages in each group. It will be noted that the vertically extending flat partition plates 122 and 124 are secured along their entire length at the endges thereof (e.g., by welding), to the wall 90 of the column forming a brine conveying conduit with a vertical portion of the column. Thus, any expansion in the partition plates produced by the flow of high temperature liquids through said conduit, is communicated incrementally along their entire length to the imemdiately adjacent portions of the outer column wall 90. Moreover, since the fluid flowing through the inter-condenser passageways itself contacts the outer wall 90 of the column, the corresponding regions of the column itself will also be subjected to similar expansion conditions. By distributing these liquid passageways at strategic locations about the periphery of the condenser column such that the liquids of each temperature range flow first along one side of the column and then along the opposite side, the binding stresses produced by the various temperatures encountered in the operation of the system are minimized.

The above-described condenser column configuration is especially well suited to simple construction and repair techniques. For example, the condenser columns 14 and 16 may be simple tube-like members of continuous cross-section. The various transverse partition plates 96 may be positioned inside the column and welded thereto at different levels as may the various flat partition plates 122 and 124 which define the various internal liquid conduits. The liquid distribution plates 100 and 102 and the screens 106 may simple be set in place on brackets (not shown) or other supporting abutments within the column. Also, plates 102 may be perforated to produce streams in place of the use of screens as heat transfer surface forming elements. As can be seen in FIGS. 2–22, there are provided manholes 148 along the condenser columns 14 and 16 at each condenser stage level. These manholes are closeable by means of removeable covers and they are of a size sufficient to admit workmen and the various removeable elements such as plates, screens, etc., making up the internal construction of the condenser stage. An examination of FIGS. 7–22 will indicate that at each condenser stage the manhole 148 is oriented to enter the column in a direction generally perpendicular to the direction in which the screens 106 extend. This permits the screens to be hung or put in place one at a time beginning with the screen furthest away from the manhole. The workman hangs the screens, one at a time, working his way back to the manhole and finally he exits through the manhole.

It will be appreciated that repairs or replacements may be made in any desired condenser stage without need for dismantling the entire column.

Reverting now to FIG. 1, it will be seen that in the first evaporator column 10, the mixture of oil and sea water, from which evaporation takes place, flows upwardly through the first evaporator stages $E_1$ to $E_{10}$ and downwardly through the last evaporator stages $E_{28}$ to $E_{34}$. In the second evaporator column 12, these liquids flow downwardly through each of the stages $E_{11}$ to $E_{27}$.

The general construction of the two evaporator columns 10 and 12 is similar to that of the two condenser columns 12 and 14. Thus, as can be seen in FIGS. 24 and 25, the first evaporator column is formed of an elongated upright tubular outer wall 150 having various internal plates and partitions (to be described) which make up its internal construction and divide it into a series of vertically arranged evaporator stages.

The internal construction of the upwardly flowing evaporator stages $E_1$-$E_{10}$ in the first evaporator column 10 is illustrated in FIGS. 24 and 25. As can be seen in FIG. 24, incoming liquid (which arrives from the oil-brine mixer 60) enters into the first evaporator stage $E_1$ via an oil-brine mixture inlet conduit 151. A lower transverse partition plate 152 extends completely across the interior of the column 10 below the conduit 151. The plate 152 is shaped to define a trap 154 in the vicinity of the conduit 151, which trap serves to provide a liquid seal for incoming liquids. The lower plate 152 extends upwardly from the trap 154 to form a well 155, and then it slopes back downwardly, as at 158, in more gradual fashion toward the side of the column 10 opposite from the conduit 151. At this opposite side of the column, the lower plate 152 is shaped to define a further trap 160 which forms the lower part of a further well 161.

Above the lower partition plate 152, there are arranged a series of intermediate transverse partition plates 162 and 164. The lowermost of these intermediate transverse plates extends from the wall 150 of the column just above the conduit 151 and slopes upwardly, first sharply, as at 165, and then more gradually, as at 166. Toward the opposite side of the column 10, the lower plate 162 extends downwardly, as at 168, and it finally terminates within the further well 160 to complete a liquid trap configuration thereat. At the lower end of the downwardly extending portion 168, there is pivotally mounted a swingable damper element 170 which controls the opening through the liquid trap. The position of the damper element 170 may be adjusted by push rods 172 which extend through the column wall 150 to control knobs 174.

The next higher intermediate transverse partition plate 164 extends from the opposite side of the column wall 150 back toward the oil-brine inlet conduit side of the column above the lower intermediate transverse partition plate 162. The plate 164 slopes upwardly, first sharply, as at 170, and then more gradually, as at 178. Finally, toward the oil-brine inlet conduit side of the wall, the plate 164 extends downwardly, as at 180, and it finally terminates within a well 182 defined by and above the sharply sloping portion 165 of the lower intermediate partition plate 164. As on the opposite side of the column, there is provided a swingable damper element 184 which cooperates with the well 182 to form a liquid trap. The damper element 184 is adjustable in a similar manner by means of push rods 186 which extend through the column wall.

Additional ones of the intermediate transverse partition plates 162 and 164 are arranged in alternate fashion, one above the other, in like manner up through the column 14. It will be seen that this internal partition plate configuration defines the successive evaporation stages $E_1$, $E_2$, etc. These stages, as shown, are of divergent cross-section, and liquid flows into each up through channels leading from the liquid traps defined by the wells 154 or 160. Within each stage, the incoming liquid mixture flows downwardly over the more gently sloping portion 178 or 166 across the column toward the well 154 or 182 on the other side. During this liquid flow, vapors are flashed from the more volatile liquid component, i.e., the pure water component of the sea water, as the liquids are subjected to lower and lower pressures in successive stages. These vapors proceed up from the flowing liquids and pass around baffle plates 188 positioned just above the flowing liquid in each stage. Above the baffle plates, there are provided demister elements 190 which divide each stage into upper and lower regions. The demister elements 190 are made of a porous material which permits vapors to flow through it, but which traps any liquid droplets which may be thrown upwardly against it. Thus, in the upper region of each stage only relatively pure vapors are present and the saline liquid droplets or oil droplets which pass through the stages are confined to its lower region.

In order to maintain proper mixture of the oil and water flowing along the gently sloping portions 166 or 178 of each stage, there are provided various turbulence-inducing elements. Toward the upstream side of each stage, a plurality of abutment elements 192 are arranged, as shown in FIG. 25, in three rows in staggered array. The incoming oil-water mixture flows over and around these abutment elements 192 and a swirling tumbling action is produced which insures maximum intermixing of the oil and water. Further downstream, there are provided a pair of weir-dam elements 196 which are raised a short distance above the surface of the partition plate 162 or 164, and which have flat upstream-facing surfaces 198 against which the flow of the oil-brine mixture impinges. As illustrated in FIG. 24, a portion of this flow is up over the weir-dam elements 196, while the remaining portion goes below these elements. This flow action produces a maximum surface exposure of the liquids flowing through the evaporator chamber to the reduced pressure in the chamber so as to achieve a good mixing an a maximum evaporation of the volatile components, i.e., the pure water in the incoming brine.

Vapor outlet openings 200 are provided in each evaporation stage above the demister element 190. These vapor outlet openings extend out through the column wall 150 and communicate via assoicated vapor conduits (not shown) to corresponding condenser chambers in the condenser column 14 and 16.

The above-described evaporator column is compact and simple in construction with the transverse partition plates 162 and 164 serving to define not only the divergent configuration of the evaporation stages, but also to define the interconnecting liquid conduits and traps. The plates 162 and 164 may be preformed and positioned and welded or otherwise affixed and sealed in place within the column.

A great deal of adjustability and flexibility is permitted in the above-described evaporator arrangement by virtue of the swingable damper elements 170 and 184 which control the flow of liquid from stage to stage. By proper adjustment of these elements, the temperature and pressure profile throughout the system may be controlled.

FIGS. 26 and 27 show modified form of evaporator column construction wherein the vertical distance between adjacent evaporator stages is considerably decreased. In this arrangement, the relative orientation of the various transverse partition plates 162 and 164 are essentially the same as those of the embodiment of FIGS. 24 and 25. In the present case, however, the transverse partition plates are placed closer to each other with the demister elements 190 being located very close to the plate forming the upper surface of each chamber. Additional baffle plates 202 are mounted between the demister elements 190 and the partition plate defining the lower surface of the chamber in order to prevent splashing of water droplets up against the demister element.

In order to provide room for withdrawal of vapors generated in each of the relatively contricted evaporator chambers, the partition plates 162 and 164, as can be seen in FIG. 27, terminate short of the side of the column from which vapor outlet openings and conduits 204 extend. A side wall 206 extends up from the edge of the partition plate to prevent liquids from flowing into the segmental region of the evaporator chamber from which the vapor outlet conduits 204 extend.

In the arrangements of FIGS. 26 and 27, there are provided various fluid passageway defining partitions and adjustable damper means of similar constructions to those shown in the preceding embodiment which are used to control the flow of liquids through the system.

Figure 28:
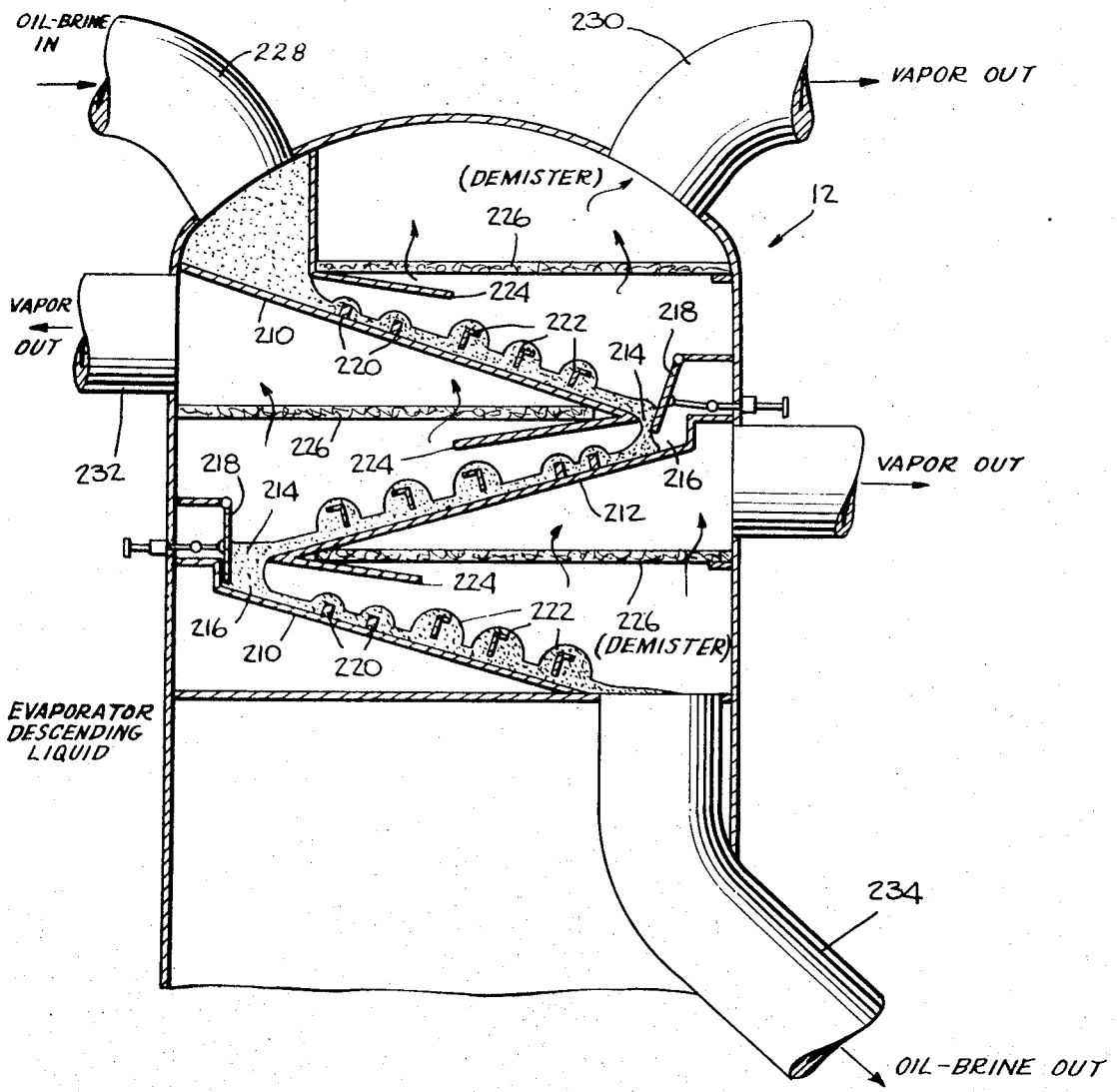
FIG. 28 is an elevational section view, partially cut away, illustrating the internal configuration of the upper portion of the second evaporator column of FIG. 1.

FIG. 28 shows internal constructions for the second evaporator column 12 and the lower portion of the first evaporator column 10 wherein the liquids flowing through the successive evaporation stages proceed in a downward direction.

As shown in FIG. 28, there are provided within the column 12, alternate series of slanted transverse partition plates 210 and 212 which extend across and slant downwardly in the column from opposite sides, respectively, and which are arranged to define openings 214 at their lower edge. The edge of each plate which is secured to the column wall is configured to define a passage 216 just under the opening 214. An adjustable damper plate 218 is mounted on the column wall just above each opening 214 to extend down through it and into the passage 216 thereunder. The damper plate and passage configuration cooperate to regulate the liquid flow and to provide fluid trap to insure a complete or partial seal to stop the vapor completely or partially from passing from one evaporator chamber to the next of lower vapor pressure. These damper plates 218 are adjusted in a manner similar to that described in conjunction with the preceding embodiments. There are also provided along the upper surface of each of the slanted transverse partition plates, abutment elements and weir-dam elements 220 and 222 which function in a manner previously described to maintain turbulence for the liquids flowing through the system so that a proper oil-brine mixture is maintained and so that a maximum free liquid surface area is exposed to the evaporator chamber. There are also provided baffle plates 224 which extend a part way along and above and parallel to the upper surface of each of the partition plates 210 and 212 above the abutments 220. These baffle plates serve to inhibit the splashing of liquid droplets up into the vapor space immediately above the flowing liquid. Demister elements 226 extend horizontally across each of the evaporator chambers defined by the respective transverse partition plates 210 and 212. Incoming liquids, i.e., an oil-brine mixture, are supplied to the evaporator column via an upper liquid inlet conduit 228 and they flow across the upper surface of the uppermost transverse partition plate 210, while the vapors which are generated during this flow proceed up through the uppermost of the demister elements 226 to an uppermost vapor outlet conduit 230. The unevaporated liquids continue to flow through the opening 214 and past the trap defined by the damper plate 218 and the well 216 and thereafter down across the upper surface of the next successive transverse partition plate 212 in the next evaporation stage. Because of the lower pressure the liquids encounter in this next stage, further evaporation takes place with vapors proceeding up through the next demister element 226 and out through a second vapor outlet conduit 232. The liquids and vapors proceed through the evaporator column in this manner, and the residual liquids eventually exit through a liquid outlet conduit 234.

It will be seen that each of the evaporator configurations described herein is characterized by completely internal interconnections for liquid flow and all external flow connections are limited to vapor flow channels. The construction in each case is quite simple and well suited for very large equipment made mainly of large diameter columns. Transverse partition plates extend across the column from opposite sides thereof in staggered or alternate array, and they define openings therethrough at the side of the column opposite the side at which they are secured to the column. Each plate is also configured to define a passage just under the opening defined by the plate immediately thereabove; and a damper plate is mounted to extend down through the opening into the passage to define a liquid trap which provides a complete or partial liquid for the vapor between stages as well as a convenient and very flexible flow control to adjust operating conditions throughout the system. A configuration similar to FIG. 26 could be used also in the case of a downflow.

Figure 29:
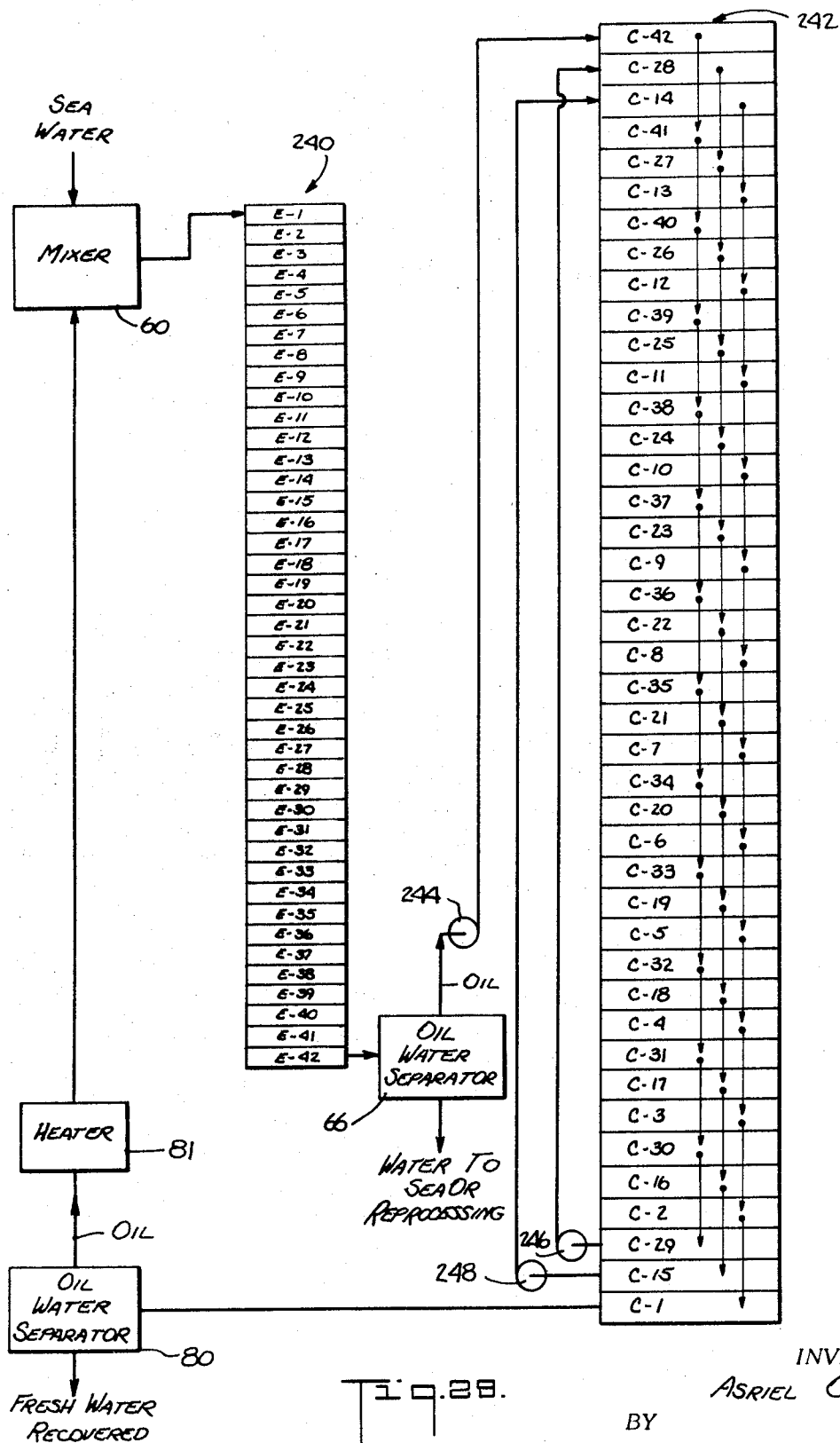
FIGS. 29–31 are diagramatic representations similar to that of FIG. 1, but showing different multistage condenser and evaporator arrangements in desalination systems in which the present invention is embodied.
Figure 30:
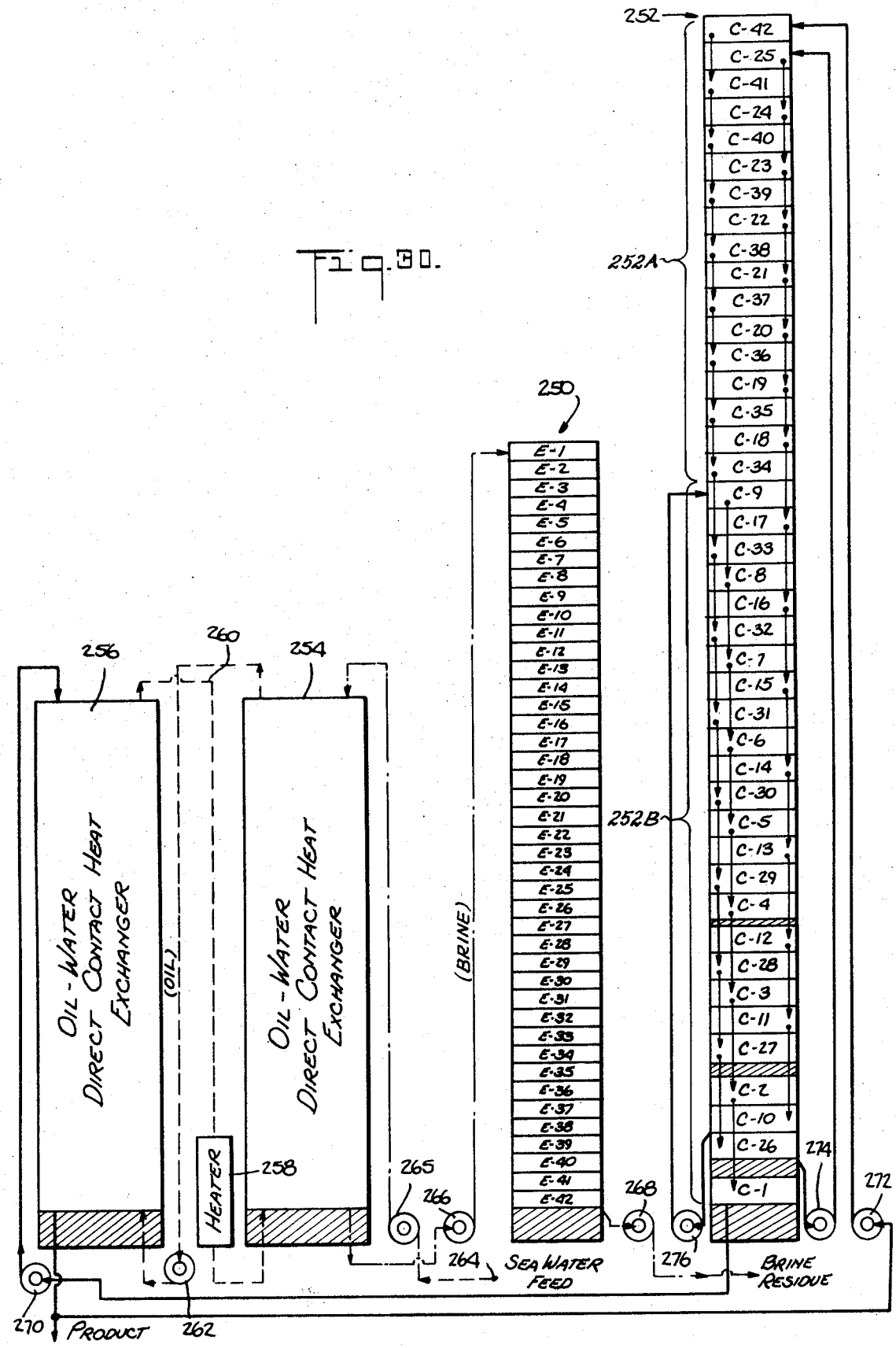
Figure 31:
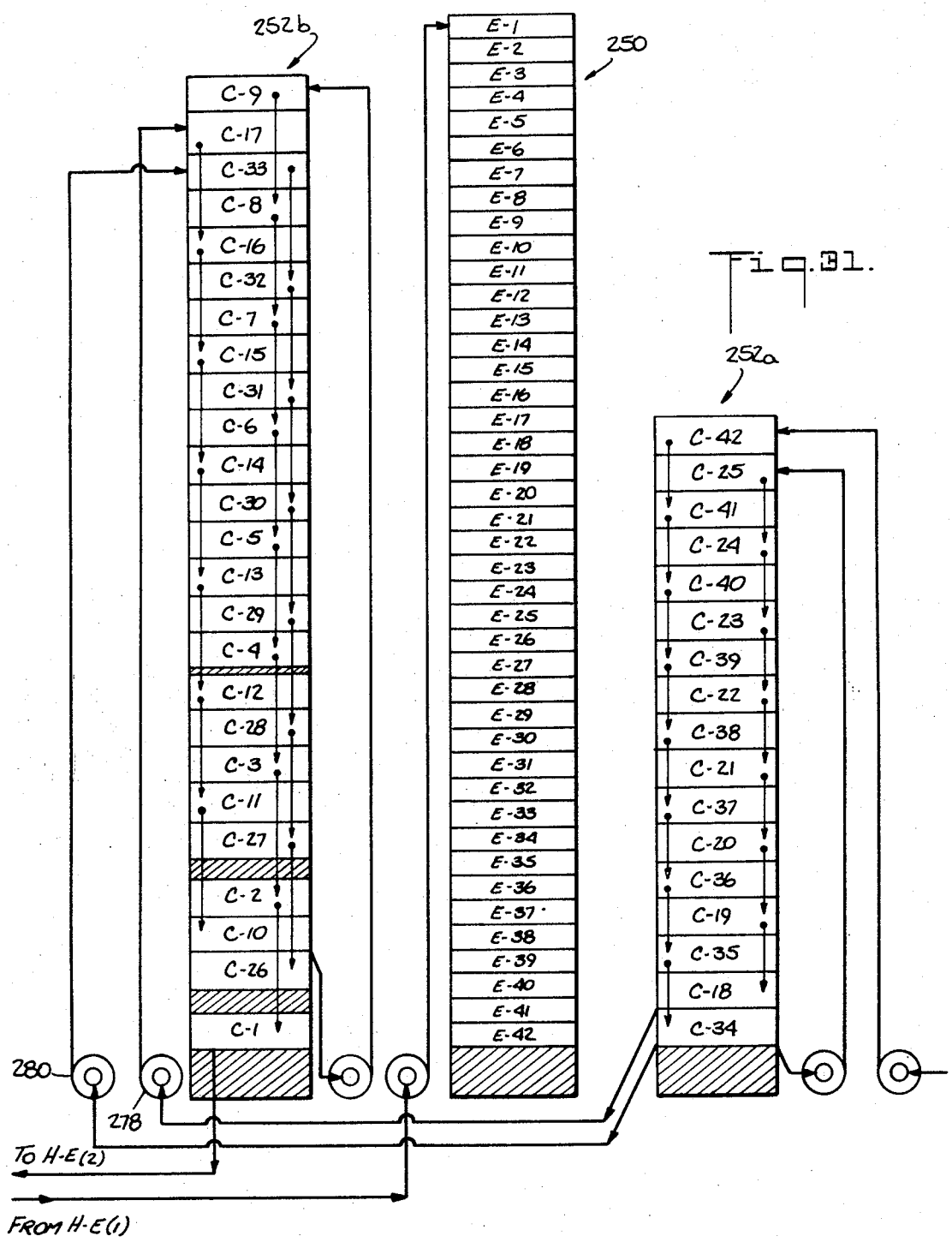

FIGS. 29–31 illustrate diagrammatically different evaporator and condenser column arrangements for maximizing operating efficiency under different operating conditions.

In the arrangement of FIG. 29, there is provided a single, 42 stage, evaporator column 240 and a single, 42 stage, condenser column 242. This sytem would employ an oil-brine mixture in the evaporator column and an oil-condensate water mixture in the condenser column. The temeprature range would be 45° to 180° C, and the residual brine will contain not more than 26 percent salts.

In the arrangement of FIG. 29, the oil-water seaparators 66 and 80, mixer 60 and heater 81 are the same as in the arrangement of FIG. 1. However, in FIG. 29, a greater number of stages are employed and only a single column is used for evaporation and only a single column is used for condensation.

It will be noted that in the condenser column 242, the condenser stages are divided into only three interspersed groups, whereas in FIG. 1, six groups were employed. In the arrangement of FIG. 1, the pressure difference from stage to stage at the higher temperature-higher pressure portion of the system is greater than in the arrangement of FIG. 29 because of the smaller number of stages and also because the arrangement of FIG. 1 provides also for the possibility of concentrating up to 34 percent compared to 26 percent of the arrangement of FIG. 29; and so a greater vertical distance between stages was required in this region to accommodate the greater pressure head differences which had to be maintained. Because of the resulting large ditance or spaces between successive condenser stages, a great number of groups of condensers than in the arrangement of FIG. 29 was utilized to take advantage of these spaces. This, however, resulted in the need for more pumps, since each group of stages requires a separate pump to bring the liquids up from the bottom stage of the preceding group to the top stage of the following group. It has been found, however, that pumping power requirements are not merely proportional to the quantity of fluid and height through which it is being pumped. In addition, a very great factor affecting pumping power is the number of pumps used. This is because of losses through pump fittings, valves, etc. These losses may amount to fifty feet of head per pump in a system such as this as well as in the known vapor repeat system using a pump for each stage.

In the 42 stage arrangement of FIG. 29, the temperature-pressure profile may be used in a more nearly uniform manner over the operating temperature range, which is between 45° and 180° C.

Accordingly, throughout the system, a relatively uniform vertical distance is maintained between interspersed condenser stages. This permits the use of only three groups of interspersed condenser stages in the system; and as can be seen, only three pumps 244, 246 and 248 are required to bring the liquids to the uppermost stage of each group.

FIG. 30 illustrates a 42 stage evaporator-condenser arrangement for a system in which no oil flows through the evaporator or condenser stages and in which the temperature range is between 30° and 150° C. as shown, there is provided a single 42 stage evaporator column 250 and a single 42 stage condenser column 252. Also, there are provided a pair of heat exchangers 254 and 256 as well as an oil heater 258. Oil is pumped through a recirculating path, indicated by the dashed line 260, by means of an oil pump 262. This path includes the two heat exchangers 254 and 256 as well as the oil heater 258. Sea water enters the system at a sea water feed point 264 and is pumped by a feed pump 265 through the first heat exchanger 254 where it becomes directly heated by the hot oil which passes through the same heat exchanger after having itself being heated in the oil heater 258. The heated sea water is then pumped by a hot brine pump 266 up to the top of the evaporator column 250; and from there the sea water passes through the column from stage to stage, giving up pure water vapors and heat. Eventually, a blowdown of brine liquid passes out from the 40 second stage and is pumped by a residue pump 268 back to the sea or to a further processing operation.

Hot liquid condensate from the last condenser stage $C_1$ is pumped by a hot condensate pump 270 through the second heat exchanger 256 where it gives up most of its heat to the oil being recirculated through the heat exchangers. This heat finds its way to the incoming sea water and is thereby recovered. The thus-cooled condensate from the second heat exchanger is then separated into a recovered product and a recycled portion. The recycled portion is pumped by a first condenser group pump 272 up to the top of the condenser column 252. The condensate passes down through each condenser stage in the first group and is thereafter pumped back up to pass through subsequent groups in succession by associated second and third condenser group pumps 274 and 276.

It will be noted that in the arangement of FIG. 30, the condenser stages are arranged in three groups with the third group, i.e., stages $C_9$, $C_8$....$C_1$ extending only half way up the column. This arrangement permits closer vertical spacing of the condenser stages in the lower temperature regions where pressure changes are relatively small, and larger vertical spacing of the condenser stages in the high temperature regions where pressure changes are greater. Because of this, it is possible to accommodate all 42 stages in a single column with a minimum amount of nonuseable intercondenser spacing. Thus, with this arrangement, the overall column height is minimized. At the same time, the number of separate condenser groups, and associated pumps, is kept to a minimum in spite of the fact that the pressure profile throughout the system is not uniform.

The system of FIG. 31 is similar to that of FIG. 30 with the exception that in FIG. 31 two condenser columns 252a and 252b are employed. The column 252a is identical to the upper portion of column 252 of the system of FIG. 30, i.e., the portion constituted by the stages between $C_{42}$ and $C_{34}$. The column 252b is identical to the remainder of column 252 of the system of FIG. 30. In the present system, further condenser group pumps 278 and 280 are required to bring the liquids from the condenser stages $C_{18}$ and $C_{34}$ at the bottom of the column 250a to the top of the column 252b. This last system arrangement represents a tradeoff whereby column height is decreased at the expense of additional pumping equipment and power. The arrangement chosen will, of course, depend on the cost of materials and the availability of power and construction facilities at the particular location where the system is installed.

I claim:

1. A multi-stage evaporation device comprising an upwardly extending tubular column, a plurality of partition plates joined to and extending across the interior of said column and vertically displaced from each other to define a series of evaporation chambers, said plates each having an opening therethrough to the next adjacent upstream evaporation chamber, downwardly extending partition means defining a liquid trap at each of said openings, said openings and liquid traps being alternately disposed on opposite sides of said column among the successive partition plates, vapor conduit means extending through the column sidewall from each evaporation chamber for the extraction the vapors generated therein and baffle means positioned within each chamber between said vapor conduit means and the partition plate which defines the floor of the chamber, the lowermost plate in each chamber being provided with a plurality of turbulence inducing abutments distributed on its upper surface.

2. A multi-stage flash evaporation system comprising an evaporation column divided into a plurality of vertically arranged flash evaporation stages, a condenser column divided into a plurality of vertically arranged direct contact condenser stages, the condenser stages being arranged in at least three groups with the stages of each group being connected in series by condensing medium and condensate conduit means, and the condenser stages of each group being interspersed elevationally within said condenser column among the condenser stages of the other groups, pumping means and further conduit means arranged to pump condensing medium from the lowermost condenser stage of one group to the uppermost stage of another group in the column so that the groups themselves are connected in series, said groups further being arranged with the condenser stages of of one of the groups being less in number than the condenser stages of the other groups, the condenser stages of said one group being distributed over only a portion of the condenser column height.

3. A multi-stage evaporation device comprising an upwardly extending tubular column, a plurality of partition plates joined to and extending across the interior of said column and vertically displaced from each other to define a series of evaporation chambers, said plates each having an opening therethrough to the next adjacent evaporation chamber, downwardly extending partition means defining a liquid well at each of said openings, said openings and liquid wells being alternately disposed on opposite sides of said column among the successive partition plates, vapor conduit means extending through the column side wall from each evaporation chamber for the extraction of vapors generated therein and baffle means positioned within each chamber between said vapor conduit means and the partition plate which defines the floor of the chamber, said downwardly extending partition means having a swingable damper extending downwardly therefrom and into said well to define a trap with the subjacent plate, each damper being controlled by connecting links which extend through the column wall.

4. A multi-stage evaporation device according to claim 3, wherein said plates are each configured to define a liquid containing trap in the upstream region of the plate in conjunction with the column.

5. A multi-stage evaporation device according to claim 3, wherein said plates are slanted inside said column alternately in different directions to define a series of evaporator chambers which increase in size in a direction toward the opening through the lowermost plate in each chamber.

6. A multi-stage vapor condensing device comprising an upwardly extending tubular column, a plurality of partition plates extending across the interior of said column and vertically displaced from each other to define a series of arranged condensing chambers, fluid passageway defining means extending along within said column and communicating between first selected pairs of vertically dispalced condensing chambers, said fluid passageway defining means comprising elongated partition plates extending along the inner surface of the column wall between said first selected condensing chambers and affixed and sealed to said column wall along the longitudinal edges of the plates, each said plate in combination with the smaller portion of the column wall between its edges defining a first of said fluid passageway defining means, a first group of said fluid passageway means bypasisng non selected intervening condensing chambers with each said elongated partition plate of said first group terminating in a vertically separate pair of said first selected chambers while passing through said intervening condensing chambers isolated therefrom and further groups of said passageway means bypassing said first selected and other non selected condensing chambers and terminating in respective interspersed pairs of condensing chambers, said first and further groups of passageway means being formed by sealing of said elongated partition plates to different peripheral regions of said tubular column.

7. A multi-stage vapor condensing device according to claim 6, wherein the passageway means passing between successive condensing chambers in said groups are distributed and arranged about the internal periphery of said column to obtain a balance of stresses due to the temperature effects produced by the liquids flowing through said passageways.

8. A multi-stage vapor condensing device according to claim 6, wherein said column is formed with a series of manholes arranged at the level of each chamber to permit access for repair and reconstruction of said chambers.

9. A multi-stage vapor condensing device according to claim 6, wherein the cross-section of said column is circular.

10. A multi-stage vapor condensing device according to claim 9, wherein the cross-section of said column is uniform along its length.

11. A multi-stage vapor condensing device according to claim 6, wherein said condensing chambers are provided with partition plates defining a liquid trap at the bottom of each fluid passageway.

12. A multi-stage vapor condensing device according to claim 6, wherein said condensing chambers are formed with liquid distribution means in the upper region thereof and communicating with said liquid trap to receive and distribute incoming liquid across the cross-section of said column.

13. A multi-stage vapor condensing device according to claim 12, wherein said condensing chambers each include liquid film-forming means beneath the liquid distribution means in each chamber.

14. A multi-stage vapor condensing device according to claim 13, wherein said liquid distribution means comprises a plurality of screens hung beneath a perforated liquid distribution plate which extends across said column.

* * * * *